United States Patent [19]
Kovačević et al.

[11] Patent Number: 5,661,525
[45] Date of Patent: Aug. 26, 1997

[54] METHOD AND APPARATUS FOR CONVERTING AN INTERLACED VIDEO FRAME SEQUENCE INTO A PROGRESSIVELY-SCANNED SEQUENCE

[75] Inventors: Jelena Kovačević, New York, N.Y.; Robert James Safranek, New Providence, N.J.; Edmund Meng Yeh, Cambridge, United Kingdom

[73] Assignee: Lucent Technologies Inc., Murray Hill, N.J.

[21] Appl. No.: 411,242

[22] Filed: Mar. 27, 1995

[51] Int. Cl.$^6$ ................................. H04N 7/01
[52] U.S. Cl. .................. 348/452; 348/451; 348/448
[58] Field of Search .................. 348/452, 448, 348/447, 441, 458, 629, 628, 625, 416, 415, 402, 451, 450; H04N 7/01, 7/00

[56] References Cited

U.S. PATENT DOCUMENTS

| | | | |
|---|---|---|---|
| 4,941,045 | 7/1990 | Birch | 348/448 |
| 5,019,903 | 5/1991 | Dougall et al. | 348/448 |
| 5,093,720 | 3/1992 | Krause et al. | 348/452 |
| 5,208,667 | 5/1993 | Saunders | 348/452 |
| 5,305,104 | 4/1994 | Jensen et al. | 348/441 |
| 5,444,493 | 8/1995 | Boie | 348/452 |

OTHER PUBLICATIONS

Dubois, E. and Konrad, J., *Motion Analysis and Image Sequence Processing*, ch. "Estimation of 2-D Motion Fields from Image Sequences with Application to Motion-Compensated Processing," Boston, MA, Kluwer Academic Publishers, 1993, pp. 53–85.

Nguyen, A., and Dubois, E., "Spatio-Temporal Adaptive Interlaced-To-Progressive Conversion," Signal Processing of HDTV, Iv, Elsevier Science Publishers B.V., 1993, pp. 749–756.

Wang, F–M., et al., "Time–Recursive Deinterlacing for IDTV and Pyramid Coding," Signal Processing: Image Communication 2, Elsevier Science Publishers B.V., 1990, pp. 365–374.

*Primary Examiner*—Safet Metjahic

[57] ABSTRACT

Method and apparatus are disclosed for deinterlacing of an interlaced video frame sequence using interpolation estimations, such as spatial and temporal interpolations. Interpolations requiring a less accurate estimation of missing pixel values in the frames being deinterlaced, such that an interpolation may be performed with a minimum of error, are performed before interpolations which require a more accurate estimation of missing pixel values for performing an interpolation, such that estimates of missing pixel values are obtained with a minimum of error. Interpolation estimations are weighted in combination for computing approximations of missing pixel values in accordance with the errors associated with the respective interpolations.

16 Claims, 4 Drawing Sheets

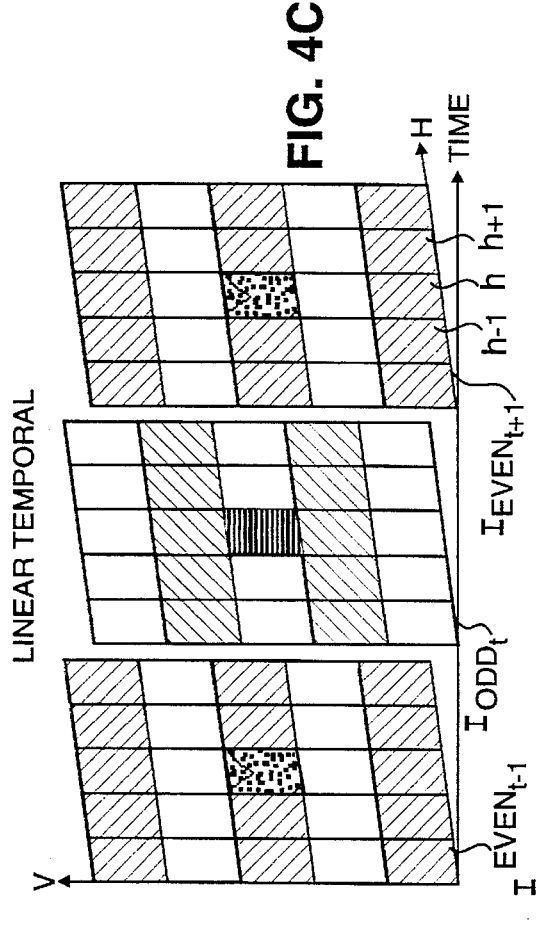
FIG. 4C LINEAR TEMPORAL
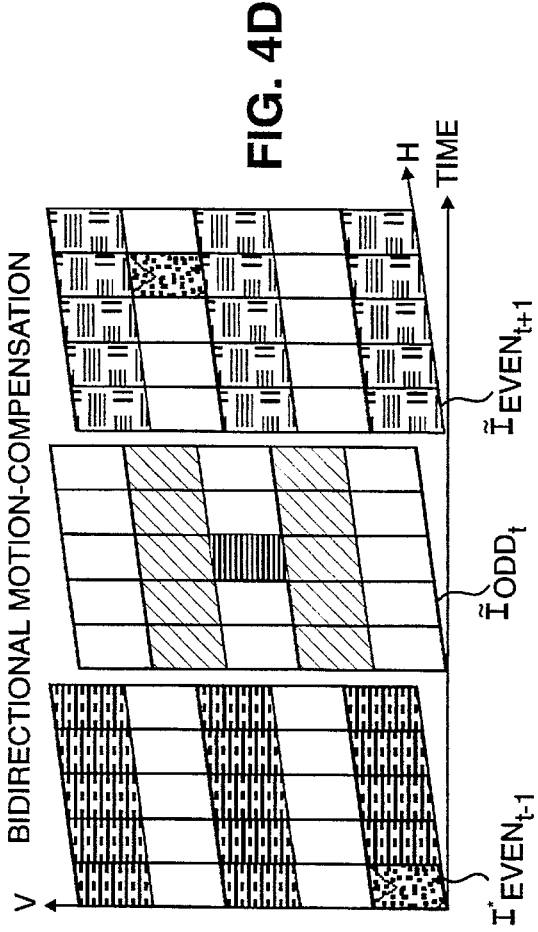
FIG. 4D BIDIRECTIONAL MOTION-COMPENSATION
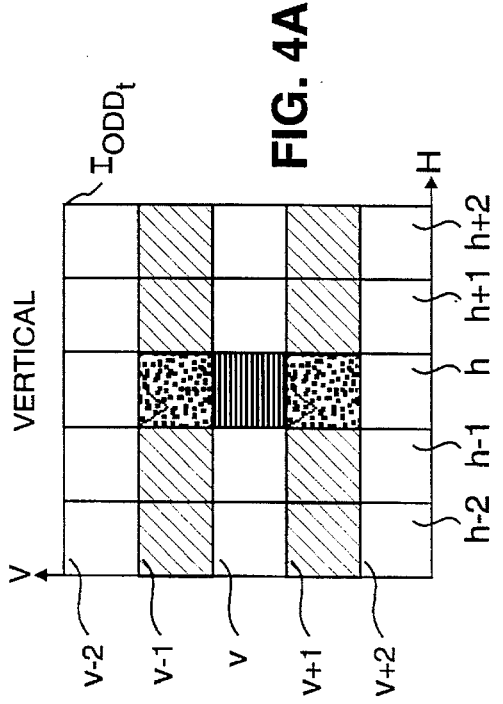
FIG. 4A VERTICAL
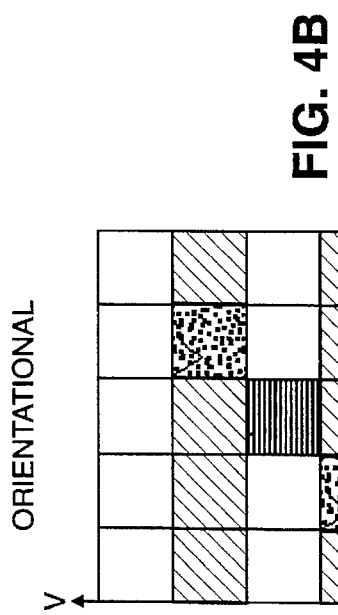
FIG. 4B ORIENTATIONAL

METHOD AND APPARATUS FOR CONVERTING AN INTERLACED VIDEO FRAME SEQUENCE INTO A PROGRESSIVELY-SCANNED SEQUENCE

FIELD OF THE INVENTION

This invention relates generally to video frame transmission and display. More particularly, the present invention relates to method and apparatus for converting interlaced scan video frame representations into progressively-scanned video frame representations.

BACKGROUND OF THE INVENTION

Currently, video is represented as sequences of frames in accordance with either the interlaced or the progressively-scanned format. Each frame comprises a matrix of pixels that represent the luminance or the chrominance of an image.

In the interlaced scan format, an image is represented using a pair of frames. The first frame of the pair, for example, includes pixels which are located only on alternate rows of the frame matrix, called horizontal lines. For the second frame of the pair, pixels are located in that frame matrix only in the corresponding horizontal lines which were missing pixels in the first frame, such that the portions of the image not represented in the first frame are represented in the second frame. The first and second frames of a pair are scanned consecutively on a video display monitor at a rate of 60 frames/sec for purposes of reconstructing the entire image on the display at the industry interlaced scan standard 30 frames/sec display rate.

The progressively-scanned format is a more recently developed video representation technique. An image is represented in its entirety using only a single frame which includes pixels in all horizontal lines of the frame matrix. Such frames, therefore, can be progressively scanned on a display at the standardized progressive display rate of 60 frames/sec.

It is well known that higher quality image reproductions may be obtained by using the progressively-scanned format rather than the interlaced scan format, because interlaced displays may typically be susceptible to line crawl and interline flicker, whereas progressively-scanned displays typically will not be. As a result, the use of the progressively-scanned format for video encoding and in video equipment, such as, for example, cameras, broadcast station transmitters and high definition television (HDTV) desktop or workstation display monitors, is currently expanding. Nevertheless, it is foreseen that the interlaced scan format will continue to be widely used, because of the higher costs associated with implementing the progressively-scanned format technology.

Several techniques for converting, or deinterlacing, a sequence of frames which have been represented using the interlaced scan format have been developed to provide that images which were initially represented using the interlaced scan format may be displayed on the higher image quality, progressively-scanned format display equipment. These techniques typically utilize a variety of well known spatial, temporal, or spatio-temporal interpolation processing for estimating the values of missing pixels in an interlaced frame. One deinterlacing technique, described in detail in A. Nguyen and E. Dubois, "Spatio-Temporal Adaptive Interlaced to Progressive Conversion," in *Proc. Int. Workshop on HDTV*, November 1992, incorporated by reference herein, estimates missing pixel values by performing a combination of spatial and temporal interpolations. This technique and other known deinterlacing techniques, however, do not accurately compute estimated values for missing pixels in an interlaced frame with a sufficient level of accuracy, such as, for example, to compensate for temporal artifacts, in order to provide for high quality image reconstruction through progressive scanning of the deinterlaced sequence of the frames.

SUMMARY OF THE INVENTION

The present invention provides a method and apparatus for converting, or deinterlacing, a sequence of video frames which are represented using the interlaced scan format to a sequence of video frames represented according to the progressively-scanned format.

In accordance with one aspect of the present invention, a plurality of interpolations are performed for computing approximations of estimated missing pixel values and, ultimately, generating a deinterlaced frame. The interpolations are performed in a sequence such that interpolations which require a more accurate approximation of missing pixel values for performing the respective interpolation estimations are performed subsequent to interpolations which require less accurate approximations of missing pixel values for performing an interpolation estimation. Interpolations are performed in this sequence to minimize the error in estimating missing pixel values for the respective interpolation computation. As a result, estimations from interpolations which depend on an approximated value of a missing pixel are computed with less error and can adequately contribute to the approximation of missing pixel values in combination with other interpolation estimations. The interpolations are weighted according to the errors each one introduces for generating the approximations of missing pixel values for a deinterlaced frame.

In another aspect of the present invention, deinterlacing of an interlaced frame comprised of luminance pixels is performed using a weighted combination of estimated values obtained from spatial and temporal interpolations. The spatial interpolations include vertical and orientational interpolations, and the temporal interpolations include linear temporal and bidirectional motion compensation interpolations. The vertical and linear temporal interpolations are performed first and use, respectively, only known pixel values of the frame being deinterlaced and known pixel values in the interlaced frames which, in time, precede and follow the frame being deinterlaced. Then, the orientational interpolation is performed using known pixel values of the frame being deinterlaced, and approximated missing pixel values for a deinterlaced frame which are based on the results of the previously performed vertical and linear temporal interpolations. Finally, the bidirectional motion compensation interpolations are performed using known pixel values and approximated missing pixel values. In particular, a backward interpolation estimation is performed using known and missing pixel values from a deinterlaced frame which, in time, precedes the frame being deinterlaced and has been approximated based on linear temporal, vertical, orientational and motion compensation interpolations. Further, a forward interpolation estimation is performed using known and missing pixel values from a deinterlaced frame which, in time, follows the frame being deinterlaced and has been approximated based on vertical, linear temporal and orientational interpolations. The forward and backward motion compensation interpolations are weighted respectively with each other, and then combined, in relationship to the vertical, linear temporal and orientational interpolations, for generating a final approximation of a deinterlaced frame.

Alternatively, an interlaced frame comprising chrominance pixels is deinterlaced using the same sequence of vertical, temporal, orientational and motion compensation interpolations described above for the luminance frame deinterlacing, and suitably modified for chrominance interlacing.

Additional features and advantages of the present invention will become readily apparent to those of ordinary skill in the art by reference to the following detailed description and accompanying drawings.

BRIEF DESCRIPTION OF DRAWINGS

FIG. 4A illustrates an interlaced frame upon which vertical interpolation may be performed for estimating missing pixel values in accordance with the present invention.

FIG. 4B illustrates an interlaced frame upon which orientational interpolation may be performed for estimating missing pixel values in accordance with the present invention.

FIG. 4C illustrates frames which are utilized for performing a linear temporal interpolation for estimating missing pixel values in an interlaced frame in accordance with the present invention.

FIG. 4D illustrates frames which are utilized for performing a motion compensated interpolation for estimating missing pixel values in an interlaced frame in accordance with the present invention.

DETAILED DESCRIPTION

The present invention uses interpolation techniques for converting, or deinterlacing, video frames which are represented using the interlaced scan format to video frames represented using the progressively-scanned format. As more fully discussed below, missing pixel values in a frame being deinterlaced are estimated using interpolations which are performed in a sequence that requires increasing accuracy in the approximations of missing pixel values for performing the respective interpolations in the sequence, thereby minimizing error in the interpolation estimations and in the approximation of a deinterlaced frame. Furthermore, the approximations of missing pixel values are computed using weighted combinations of the interpolations.

At this point, an explanation of the representation of video images as sequences of frames using matrices of pixels, in accordance with the interlaced scan and progressively-scanned formats, respectively, is provided to allow for a better understanding of the deinterlacing technique of the present invention.

Figure 1B:
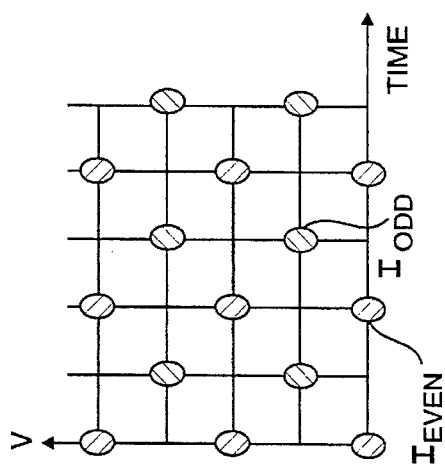
FIGS. 1A and 1B illustrate a sequence of frames that represent images which are represented according to the interlaced scan format.
Figure 2B:
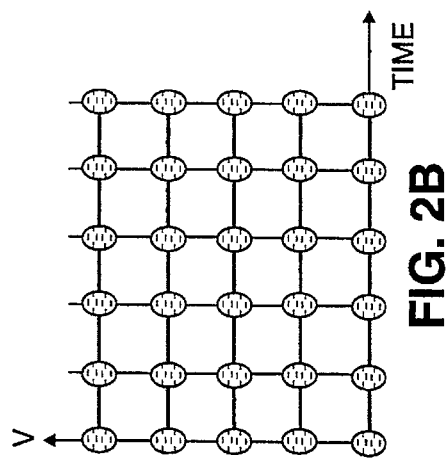
FIGS. 2A and 2B illustrate a sequence of frames that represent images which are represented according to the progressively-scanned format.
Figure 1A:
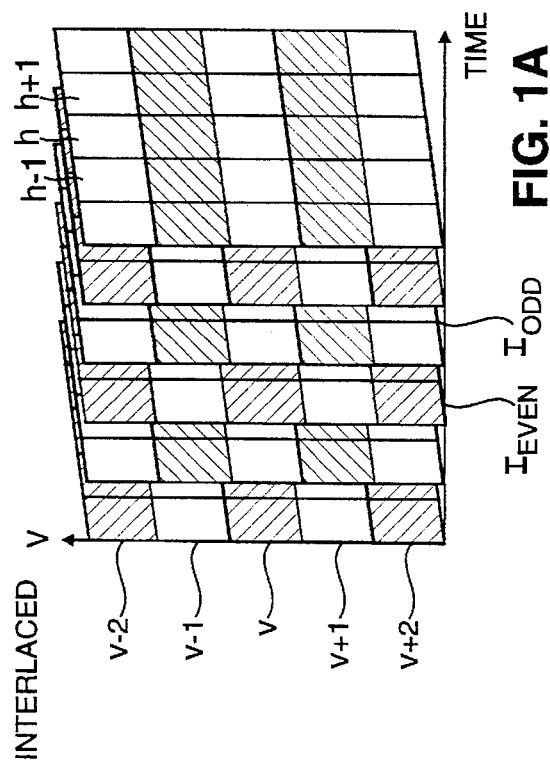
Figure 2A:
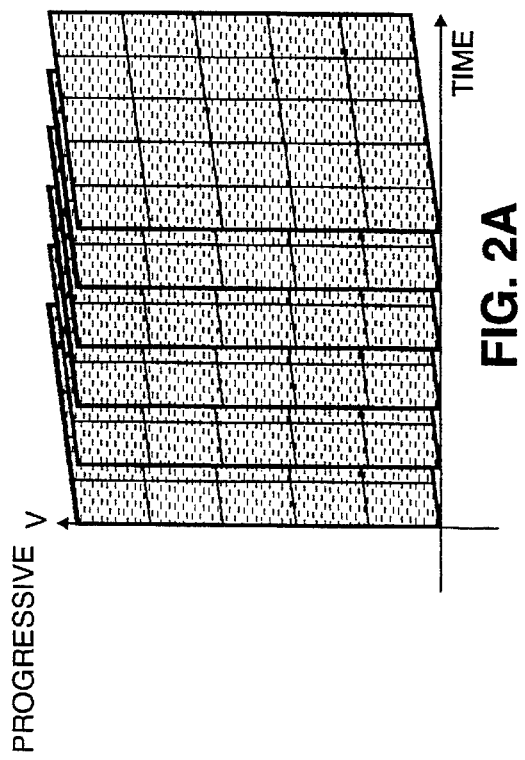

FIG. 1A illustrates a sequence of frames over time which are represented according to the interlaced scan format. FIG. 2A illustrates a sequence of frames over time which are represented according to the progressively-scanned format. In general, for both the interlaced scan and progressively-scanned formats, a frame comprises a matrix of pixels. Each pixel in the matrix typically corresponds to an eight bit data value which is representative of either the intensity or color of the light in a spatially corresponding location of the represented image. As conventional in the art, a frame matrix is defined in terms of vertical pixel locations, v, and horizontal pixel locations, h. For purposes of clarity and simplicity, the present inventive technique is initially explained with reference to the deinterlacing of a sequence of frames whose pixels represent the intensity or luminance of an image. It is to be understood that the frames illustrated in the FIGURES and referred to in the text below only represent a portion of an image, and that the techniques described below may be used for estimating all missing pixel values for purposes of entirely deinterlacing an interlaced frame in accordance with the present invention.

Referring to FIG. 1A, the interlaced scan format provides that each image which is recorded or captured by, for example, a camera, is represented as a pair of frames. Each frame in the pair includes pixels representative of one-half of the entire image which was captured, such that both frames of pixels are required for reconstructing the image. By way of example and as illustrated in FIG. 1A, a pair of frames representative of an image may suitably include frames $I_{ODD}$ and $I_{EVEN}$. The $I_{ODD}$ frame includes pixels which are located only in odd numbered horizontal lines of the matrix, such as in lines v−1 and v+1, while the $I_{EVEN}$ frame includes pixels which are located only in even numbered horizontal lines, such as in lines v−2, v and v+2.

FIG. 1B illustrates the appearance of pixels on a display resulting from scanning pairs of interlaced frames, such as the frames $I_{ODD}$ and $I_{EVEN}$ of FIG. 1A, on the display. As shown in FIG. 1B, when a sequence of pairs of interlaced frames is scanned on the display, the pixel data appear on alternate vertical lines over time, in an interlaced manner. The frames are typically scanned at 60 frames/sec, such that the entire image may be reconstructed according to the industry interlaced scan standard display rate of 30 frames/sec.

In the progressively-scanned format, as shown in FIG. 2A, each frame contains pixels in all horizontal lines, such that the pixels in a single frame represent an entire image which has been captured. FIG. 2B illustrates the appearance of pixels in horizontal lines of a display when a sequence of these frames is progressively-scanned on a display.

In comparing FIGS. 2A and 2B with FIGS. 1A and 1B, the locations which are missing pixels in an interlaced frame matrix are evident. The present invention provides a novel technique for accurately computing estimated values for the missing pixels in an interlaced frame, such that a sequence of deinterlaced frames may be generated for purposes of progressively scanning and reconstructing a high quality image on a display.

In accordance with the present invention, interpolations are performed in a sequence for estimating missing pixel values. The sequence requires that interpolations which depend least upon previous interpolation processing, for example, interpolations which rely exclusively on known pixel values for estimating a missing pixel value, are performed before interpolations whose estimation accuracy depends substantially on previous interpolation processing for obtaining approximated values for missing pixels in the frame being deinterlaced. Interpolations which require approximations of missing pixel values for their computations include, for example, motion compensation which requires motion vectors for an image to be determined such that an estimate of missing pixel values may be accurately computed by that interpolation. In addition, when an approximation of missing pixel values is performed using more than one interpolation estimation, the approximation is performed using a weighted combination of the interpolations being relied upon in order to weigh more heavily in the approximation those interpolations having the least error associated with the computation.

For example, in the performance of a motion compensation interpolation, known pixel values in interlaced frames and approximations of missing pixel values in frames which have been deinterlaced to various orders of accuracy may be utilized for determining the motion vectors associated with computing estimated missing pixel values.

Various levels of approximations of missing pixel values, in other words, deinterlaced frame approximations, may be generated, depending on the number of similar types of interpolations performed in a sequence. For example, a linear temporal and vertical interpolation may be performed, and then weighted in combination together at one stage of the sequence, because both depend only upon known pixel values in an interlaced frame for performing the estimation of missing pixel values in a frame being deinterlaced.

In one preferred embodiment of the present invention, spatial interpolations are performed in combination with temporal interpolations to estimate missing pixel values in a frame being deinterlaced in accordance with the following generalized deinterlacing equation:

$$I^*(h,v,t) = \xi I_T^*(h,v,t) + (1-\xi)I_S^*(h,v,t). \quad (1)$$

In equation [1], the coordinates (h,v,t) identify a pixel location in a frame matrix, $I_T^*$ refers to the results of linear temporal and motion compensation interpolations along the estimated motion trajectory, $I_S^*$ refers to the result of spatial interpolation and $\xi$ is used for applying appropriate weighting factors to the spatial and temporal interpolations, respectively. In a preferred embodiment, $I_S^*$ consists of vertical and orientational interpolation results, and $I_T^*$ comprises linear temporal and motion-compensated interpolation results. It is to be understood that other interpolations may be performed and combined for generating an approximation of missing pixel values and, ultimately, a deinterlaced frame, depending on the level of accuracy required for estimating missing pixel values using a particular interpolation process.

Figure 3:
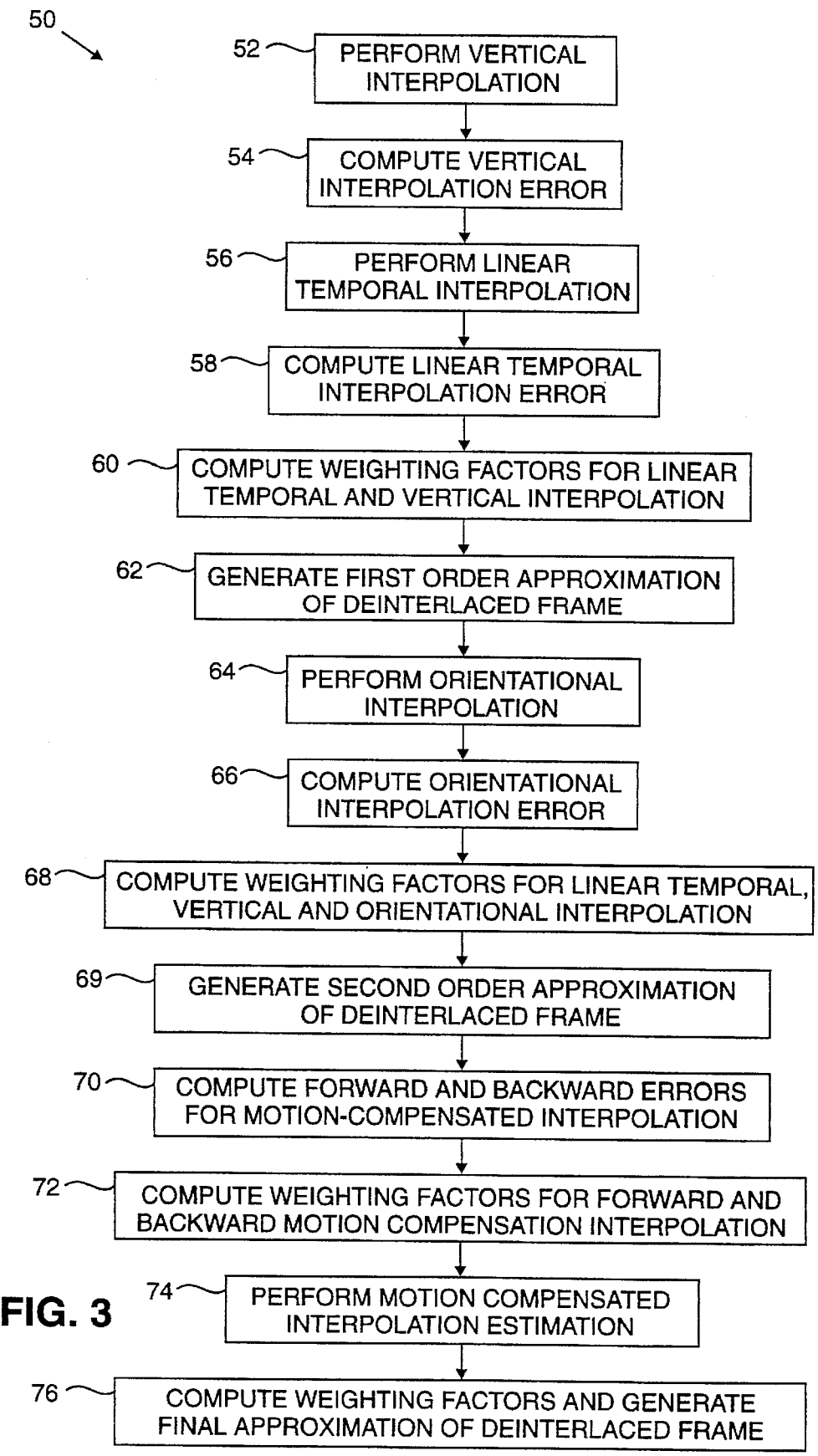
FIG. 3 is a flow diagram of a method for deinterlacing a sequence of interlaced frames in accordance with the present invention.

FIG. 3 shows a process 50 for deinterlacing an interlaced frame in accordance with the equation [1]. The advantages of the process 50 are highlighted through the deinterlacing of an exemplary interlaced frame, $I_{ODD_t}$, which is similar in structure and pixel arrangement to the frame $I_{ODD}$ shown in the FIG. 1A. The frame $I_{ODD_t}$ is reproduced in FIGS. 4A and 4B for purposes of illustrating vertical and orientational interpolations performed in accordance with the present inventive technique. FIGS. 4C and 4D show how deinterlaced frames, which, in time, immediately precede and follow the frame $I_{ODD_t}$ and are at various orders of approximation accuracy, may be used for deinterlacing $I_{ODD_t}$.

Referring to FIG. 4A, the frame $I_{ODD_t}$ is missing pixels in alternate horizontal lines v+2, v and v−2. The process 50 attempts to estimate values for the missing pixels in these lines through spatial and temporal interpolation techniques. By way of example, the process 50 is performed for estimating the value of the missing pixel at position (h,v,t) in the frame $I_{ODD_t}$. For ease of reference, I(h,v,t) is defined as the intensity of the missing pixel, MP, at location (h,v,t) of $I_{ODD_t}$. Of course, the values of other missing pixels in the line v and in the entire frame $I_{ODD_t}$ may be estimated using the process 50, such that a completely deinterlaced representation of the frame $I_{ODD_t}$ may be generated for use with the progressive scanning format.

In the exemplary embodiment of the present invention, the process 50 first approximates the values of missing pixels from the results of vertical and linear temporal interpolations. Then, missing pixel values are estimated from an orientational interpolation. The orientational interpolation finds a local edge displacement scalar using missing pixel values from the first approximation of the deinterlaced frame which was obtained from the vertical and linear temporal interpolation estimations. Finally, a motion compensated interpolation is performed using backward and forward motion compensation interpolations by first identifying backward and forward motion vectors, respectively. The backward motion vector is determined using known and missing pixel values in a frame which, in time, immediately precedes the frame being deinterlaced, where the preceding frame is a frame which has been completely deinterlaced in accordance with the process 50. The forward motion vector is determined using known and missing pixel values in a frame which, in time, immediately follows the frame being deinterlaced, where the following frame is a frame which has been deinterlaced by the performance of vertical, linear temporal and orientation interpolation estimations in accordance with the process 50.

Figure 5:
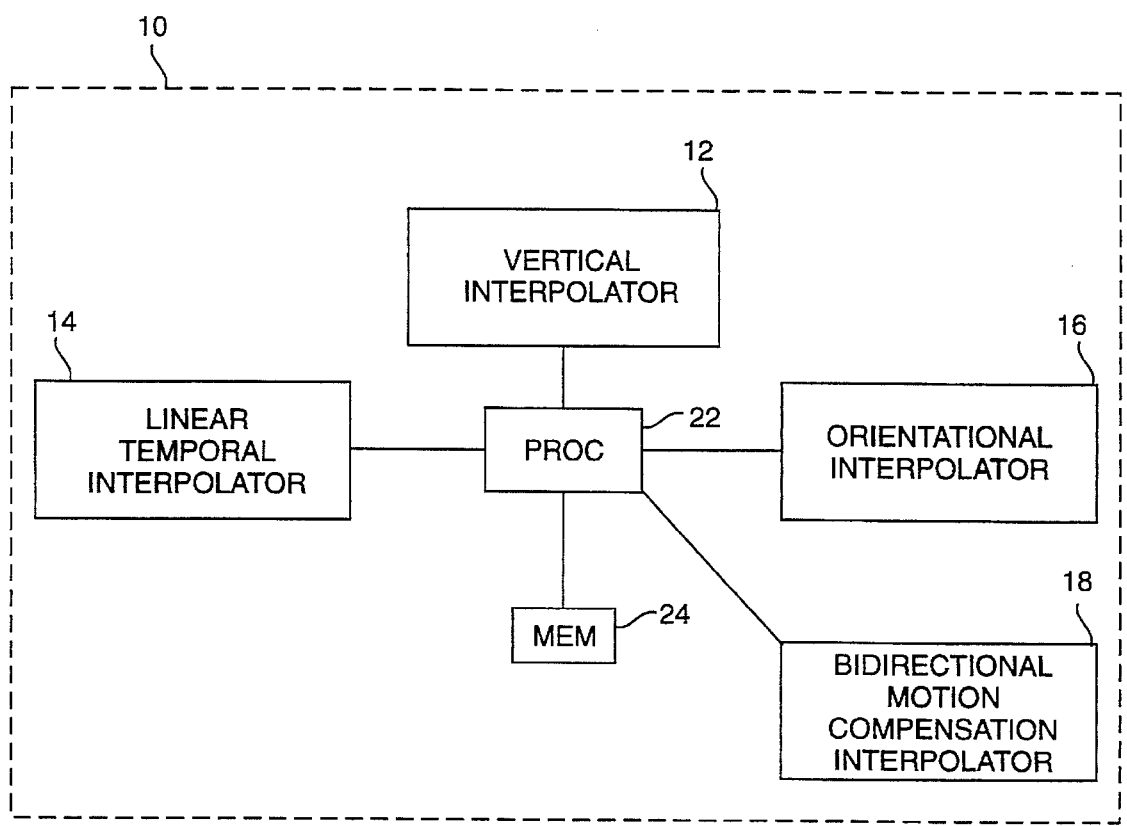
FIG. 5 illustrates a generalized block diagram of functional blocks of an apparatus which may suitably perform operations associated with converting video frames represented using the interlaced scan format to video frames represented using the progressively-scanned format in accordance with the present invention.

FIG. 5 shows an exemplary embodiment of an apparatus 10 for deinterlacing an interlaced sequence of frames in accordance with the process 50. The apparatus 10 suitably comprises individual functional blocks. The functions these blocks represent may be provided through the use of either shared or dedicated hardware, including but not limited to hardware capable of executing software. In a preferred embodiment, the functional blocks in the apparatus 10 comprise a vertical interpolator 12, a linear temporal interpolator 14, an orientational interpolator 16, a bidirectional motion compensation interpolator 18, all of which are connected to a standard processor 22. The processor 22 is connected to a conventional memory 24, such as a ROM. As explained below, the functional blocks in the apparatus 10 perform selected arithmetic computations, and provide data representative of the results of these computations to the processor 22. The processor 22 conventionally stores such data, as well as other processed data results, in the memory 24, as required. It is to be understood that the operations performed by the functional blocks and the processor 22 may be similarly performed using a single shared processor. Such a processor may comprise a standard digital signal processor and would include read only memory or other appropriate memory for storing software and performing the operations discussed below. Further, the present inventive technique may be implemented using firmware or by discrete components implemented in an integrated circuit. Other suitable embodiments may be readily implemented by those of ordinary skill in the art.

Referring to FIG. 3, in step 52, the vertical interpolator 12 computes an estimated value, $I_v(h,v,t)$, for MP based on the pixel values at locations in $I_{ODD_t}$ which are located in the horizontal lines above and below and in the same vertical line as MP or at I(h,v−1,t) and I(h,v+1,t), respectively, as shown in FIG. 4A, according to the following equation:

$$I_v(h,v,t)=\tfrac{1}{2}(I(h,v-1,t)+I(h,v+1,t)) \quad (2)$$

The processor 22 then stores the value of $I_v(h,v,t)$ in the memory 24. For purposes of simplicity in explaining the present invention, it is assumed that the processor 22 is pre-programmed for automatically storing in the memory 24 the results of computations for estimating a missing pixel value as well as any other computational results which are necessary for performing the operations described in the steps of the process 50.

It is well known that performing an interpolation for estimating a missing pixel value from other known pixel values in the same frame or from other frames, or from approximations of missing pixel values in the same frame or other frames, is subject to error. The error associated with performing an interpolation estimation is typically computed by utilizing pixel values which are located in the neighborhood of or surrounding the pixels which were used in a particular interpolation estimation. For example, pixel values within 2 vertical lines of the pixels used in the vertical interpolation computation may be used to compute the vertical interpolation error. As more fully discussed below, the error associated with a particular interpolation is used for determining how much weight should be given to the interpolation when more than one interpolation estimation value is utilized for generating an approximation of a deinterlaced frame.

Referring to FIG. 3, in step 54, the vertical interpolator 12 suitably computes a vertical interpolation error value, $E_v$, in accordance with the equation:

$$E_v = \sum_{i=h-2}^{h+2} |I(i,v-1,t) - I(i,v+1,t)|. \quad (3)$$

Then, in step 56, the linear temporal interpolator 12 computes an estimated value, $I_t(h,v,t)$, for MP by averaging known values of spatially corresponding pixels in the interlaced frames which, in time, immediately precede and follow the frame being deinterlaced. The value for $I_t(h,v,t)$ is determined, in general, from the equation:

$$I_t(h,v,t)=\tfrac{1}{2}(I(h,v,t-1)+I(h,v,t+1)). \quad (4)$$

where, as illustrated in FIG. 4C, the known pixel values in the frames $I_{EVEN_{t-1}}$ and $I_{EVEN_{t+1}}$ are utilized in I(h,v,t−1) and I(h,v,t+1), respectively. In step 58, the linear temporal interpolator 14 computes an error, $E_t$, associated with performing a linear temporal interpolation estimation according to the equation:

$$E_t = \sum_{i=h-2}^{h+2} |I(i,v,t-1) - I(i,v,t+1)|. \quad (5)$$

In step 60, the processor 22 computes a first level approximation for MP based on the results of the vertical and linear temporal interpolations which were performed in steps 52 through 58. As conventional in the art, appropriate weighting factors, $k_x$, are computed for each estimated interpolation value which is used in combination with other interpolation estimations for computing approximations of missing pixel values that are used for generating a deinterlaced frame. The weighting factor for an interpolation is computed based on a comparison of its error relative to the errors associated with other interpolations which are combined in the approximation, such that interpolation estimations having smaller errors relative to other interpolation estimations are weighed more heavily in the approximation of missing pixel values used for generating a deinterlaced frame. In particular, in step 60, the weighting factors $\hat{k}_v$ and $\hat{k}_t$ for the vertical and linear temporal interpolations, respectively, are computed from equations:

$$\hat{k}_v = \frac{\frac{1}{E_v}}{\frac{1}{E_v}+\frac{1}{E_t}} \quad (6A)$$

and $$\hat{k}_t = \frac{\frac{1}{E_t}}{\frac{1}{E_v}+\frac{1}{E_t}}. \quad (6B)$$

After the weighting factors $\hat{k}_v$ and $\hat{k}_t$ are computed, in step 62, the processor 22 computes a first order approximation, $\hat{I}(h,v,t)$, for MP from the equation:

$$\hat{I}(h,v,t)=\hat{k}_v I_v(h,v,t)+\hat{k}_t I_t(h,v,t), \quad (7)$$

As shown in equation [7], the vertical and linear temporal interpolation estimations are weighted according to their relative errors. In practical application of the present inventive technique, all missing pixel values in a frame being deinterlaced are approximated in accordance with steps 52 through 62 of the process 50, such that a first order approximation of a deinterlaced frame is effectively generated in step 62.

In steps 64 to 66, the orientational interpolator 16 computes an estimate for MP based on the pixel values in the first order deinterlaced frame. First, as well known in the art, the orientational interpolator 16 computes the displacement, $\delta_h$, due to a local edge orientation for the frame matrix location of MP. For an interlaced frame which is comprised of luminance pixel values, it is well known that $\delta_h$ is equal to $0.5/\tan\beta_{(h,v)}$. In accordance with the present invention, the orientational interpolator 16 determines the angle $\beta_{(h,v)}$ associated with the local edge orientation for MP using known pixel values and estimated missing pixels which are approximated in the first order deinterlaced frame, $\hat{I}_{ODD_t}$, in other words, based on a frame which was deinterlaced using both linear temporal and vertical interpolation techniques. For ease of illustration, it is assumed that all missing pixel values in $I_{ODD_t}$ have been approximated, such that a deinterlaced frame $\hat{I}_{ODD_t}$ may be referenced at the time that an orientational interpolation computation is performed. By way of example and as shown in FIG. 4B, the orientational interpolator 16 may determine that the local edge passes through MP oriented from (h−1,v+1,t) to (h+1,v−1,t), such that the pixel values at these spatial orientations are used in computing an orientational interpolation estimation value for MP.

After β and subsequently $\delta_h$ are determined, the orientational interpolator 16 then computes an orientation interpolation estimate, $I_o(h,v,t)$, for MP using the equation:

$$I_o(h,v,t)=\tfrac{1}{2}(\hat{I}(h-\delta_h,v-1,t)+\hat{I}(h+\delta_h,v+1,t)). \quad (9)$$

Then, in step 66, the orientational interpolator 16 computes an error value, $E_o$, associated with the orientational interpolation estimation, $I_o$, using approximated pixel values from the first order deinterlaced frame $\hat{I}_{ODD_t}$, according to the equation:

$$E_o = \sum_{i=h-2}^{h+2} |\hat{u}(i - \delta_h, v - 1, t) - \hat{I}(i + \delta_h, v + 1, t)|. \quad (10)$$

In step 68, the processor 22 computes vertical, linear temporal and orientational interpolations weighting factors $\tilde{k}_v$, $\tilde{k}_t$, and $\tilde{k}_o$, respectively, from the following equations:

$$\tilde{k}_v = \frac{\frac{1}{E_v}}{\frac{1}{E_v} + \frac{1}{E_t} + \frac{1}{E_o}}, \quad (11A)$$

$$\tilde{k}_t = \frac{\frac{1}{E_t}}{\frac{1}{E_v} + \frac{1}{E_t} + \frac{1}{E_o}}, \quad (11B)$$

and $$\tilde{k}_o = \frac{\frac{1}{E_o}}{\frac{1}{E_v} + \frac{1}{E_t} + \frac{1}{E_o}}. \quad (11C)$$

In step 69, Using these weighting factors, the processor 22 computes a second order approximation, $\tilde{I}(h,v,t)$, for MP from the equation:

$$\tilde{I}(h,v,t) = \tilde{k}_v I_v(h,v,t) + \tilde{k}_t I_t(h,v,t) + \tilde{k}_o I_o(h,v,t). \quad (12)$$

In practical application, all missing pixel values in the frame being deinterlaced are approximated in steps 68 and 69 in order that a second order approximation of the frame being deinterlaced is generated.

In steps 70 through 76, the bidirectional motion compensation interpolator 18 computes an estimated value for MP using conventional motion compensation techniques which account for motion of an object over time. Motion compensation is performed bidirectionally to allow for better estimation of missing pixel values in the case of scene changes, such as objects which are covered in one frame but are uncovered in a preceding or following frame. As in the orientational interpolation performed in steps 64 through 66, approximated missing pixel values along with known pixel values in the frame being interlaced are utilized for performing initial computations, in other words, computing motion vectors, required for performing a motion compensation interpolation estimation.

The motion compensation interpolator 18 first estimates motion over time, and then interpolates along the direction of the motion. Motion estimation is typically performed by matching a block of pixels in one frame with a block of pixels in another frame using a given search window. In an alternative embodiment, motion may be estimated by using pixel-based motion estimation techniques. In the exemplary embodiment of the present invention, a motion vector is preferably estimated using smaller sized blocks and larger search areas in order to obtain very accurate estimates of the spatial motion of objects across an image over time, as represented in a sequence of video frames. The use of smaller blocks with large search areas for identifying a motion vector, of course, requires more processing time. The added complexity and time of processing, however, is inconsequential because deinterlacing in accordance with the present invention is preferably performed off-line, that is, not in real time. In the event that deinterlacing is performed for real time video data transmissions and display using progressive scanning, the typical selection of larger block sizes and smaller search areas for identifying a motion vector may compromise the quality of the deinterlaced frame ultimately obtained, as viewed on a display. In the case case where the estimate of a motion vector is is not extremely accurate, the result of the motion compensation interpolation estimation is likely to have significant error and not to be given adequate weight in generating estimated missing pixel values for an approximation of a deinterlaced frame in accordance with the present invention. For ease of reference, $(d_{h_b}, d_{v_b})$ and $(d_{h_f}, d_{v_f})$ are the backward and forward motion or displacement vectors, respectively, which would be typically computed.

The motion compensation interpolator 18 identifies motion vectors for performing bidirectional, or forward and backward motion, interpolations. Both forward and backward motion interpolation estimations are performed in order to provide for an accurate estimation of the movement of an object over time, as represented in pixels located at spatial coordinates of a matrix that follow the motion vector. By way of example, an object captured in an image may appear in one frame, which is the frame being deinterlaced, but be completely absent from a preceding or following frame.

The bidirectional interpolations utilize missing pixel values in deinterlaced frames which have been approximated to various levels of accuracy in accordance with the process 50. In particular, the bidirectional interpolation provides for a two part computation of a motion compensated interpolation value for MP. In the first part, pixel values of a deinterlaced frame which, in time, immediately precedes the frame being deinterlaced are used for computing a backward motion interpolation estimation value for MP. As shown in FIG. 4D, the immediately preceding frame is the frame $I_{*EVEN_{t-1}}$ which has been completely deinterlaced according to the process 50. For the second part of the interpolation, pixel values of a deinterlaced frame which, in time, immediately follows the frame being deinterlaced are used for computing a forward motion interpolation estimation value for MP. The immediately following frame, as shown in FIG. 4D, is the frame $I_{*EVEN_{t+1}}$ which has been deinterlaced to a second level of approximation according to the process 50. By way of example and referring to FIG. 4D, backward and forward motion vectors may identify the known pixel at (h−2,v+2) in the preceding frame and the missing pixel value at (h+1,v−1) in the following frame as the pixels associated with motion of an object encoded in MP. In this manner, the present invention obtains a more accurate estimate of a missing pixel value based on pixel values in a frame which has been deinterlaced. As in the other interpolations described above, the forward and backward interpolation estimation values are appropriately weighted in combination as more fully discussed below.

Referring to FIG. 3, in step 70, once the forward and backward motion vectors are identified, the motion compensation interpolator 18 computes the errors, $E_{m_b}$ and $E_{m_f}$, associated with backward and forward motion compensation interpolation estimations, respectively, using the following equations:

$$E_{m_b} = \sum_{i=h-2}^{h+2} |\tilde{u}(i,v,t) - I^*(i - d_{h_b}, v - d_{v_b}, t - 1)| \quad (16)$$

and $$E_{m_f} = \sum_{i=h-2}^{h+2} |\tilde{u}(i,v,t) - \tilde{I}(i - d_{h_f}, v - d_{v_f}, t + 1)|. \quad (17)$$

Then, in step 72, the motion compensation interpolator 18 computes the forward and backward weighting factors, $k_b$, and $k_f$, respectively, required for generating a motion compensation interpolation estimation value for MP, using the equations:

$$k_b = \frac{\frac{1}{E_{m_b}}}{\frac{1}{E_{m_b}} + \frac{1}{E_{m_f}}} \quad (18)$$

and $$k_f = \frac{\frac{1}{E_{m_f}}}{\frac{1}{E_{m_b}} + \frac{1}{E_{m_f}}}. \quad (19)$$

The total error for the motion compensation interpolation is expressed by:

$$E_m = k_b E_{m_b} + k_f E_{m_f} \quad (20)$$

In step 74, the motion compensation interpolator 18 computes an estimated motion compensation interpolation value, $I_m(h,v,t)$, for MP using the equation:

$$I_m(h,v,t) = k_b I^*(h-d_{h_b}, v-d_{v_b}, t-1) + k_f I(h-d_{h_f}, v-d_{v_f}, t+1) \quad (21)$$

Finally, in step 76, the processor 22 computes a final approximation, $I^*(h,v,t)$, for MP, using the results of all four previously performed interpolations, according to the equation:

$$I^*(h,v,t) = k_v I_v(h,v,t) + k_t I_t(h,v,t) + k_o I_o(h,v,t) + k_m I_m(h,v,t), \quad (22)$$

where the weighting factors for all the combined interpolation estimations are computed in accordance with the generalized weighting expression:

$$k_x = \frac{\frac{1}{E_x}}{\frac{1}{E_v} + \frac{1}{E_t} + \frac{1}{E_o} + \frac{1}{E_m}}, \quad (23)$$

where the subscript x of $k_x$ is set equal to v, t, o, and m for computing the weighting factors $k_v$, $k_t$, $k_o$ and $k_m$, respectively, associated with the vertical, linear temporal, orientation and motion compensation interpolation estimations.

In a further aspect of the present invention, frames which are represented using the interlaced scan format to represent the chrominance or coloring of images may be deinterlaced for use in progressively scanned format. As well known in the art, an interlaced frame which is comprised of chrominance pixels is essentially a luminance matrix which has been downsampled by two horizontally. In other words, a chrominance interlaced frame contains chrominance pixels on alternate vertical lines of the frame matrix.

The process 50, as explained above, may be similarly performed for deinterlacing a chrominance interlaced frame by implementing the following changes for the orientational and motion compensation interpolations. First, for the orientational interpolation, the angle β which would be obtained for deinterlacing of a given pixel (h,v,t) in the interlaced luminance frame is utilized in the estimation, except that the horizontal displacement expression, $\delta_h$, is set equal to $0.25/\tan\beta_{(h,v)}$. The expression for $\delta_h$ is modified because the distance between two pixels in the chrominance interlaced frame equals twice the distance between two pixels in the luminance interlaced frame. For motion compensation interpolation, for a given pixel (h,v,t), the pixel locations identified by the motion vectors computed for deinterlacing the luminance interlaced frame are utilized in the estimation, unless a motion vector points to a nonexistent or missing pixel location in an interlaced chrominance frame. If this circumstance occurs, the pixel value used for performing the motion compensation interpolation is the average of the two pixel values horizontally adjacent to the missing pixel location pointed to by the motion vector.

It is to be understood that the embodiments and variations shown and described above are illustrative of the principles of this invention only and that various modifications may be implemented by those skilled in the art without departing from the scope and spirit of the invention.

We claim:

1. A method for converting a sequence of interlaced video frames to a sequence of video frames formatted for progressive scanning comprising the steps of:

performing at least one first interpolation using known pixel values in the interlaced sequence of frames for estimating missing pixel values in an interlaced frame being deinterlaced;

computing a first level approximation of missing pixel values in the interlaced frame being deinterlaced using the estimated missing pixel values obtained from the at least one first interpolations, wherein the at least one first interpolations are weighted in combination relative to the errors associated with each first interpolation in computing the first level deinterlaced frame;

performing at least one second interpolation for estimating missing pixel values in the interlaced frame being deinterlaced using known pixel values in the sequence of interlaced frames and approximated missing pixel values in the first level deinterlaced frame; and, computing a second level approximation of missing pixel values in the interlaced frame being deinterlaced using the estimated missing pixel values obtained from the at least one first and second interpolations, wherein the at least one first and second interpolations are weighted in combination relative to the errors associated with each first and second interpolation which was performed.

2. The method of claim 1, further comprising the step of:

performing subsequent at least one interpolations in a sequence for estimating missing pixel values using previously approximated missing pixel values in deinterlaced frames, said sequence comprised of interpolations which require a less accurate approximation of the missing pixel values for performing the respective interpolation estimation, said less accurate approximation interpolations being performed prior to the interpolations included in the sequence which require a more accurate approximation of the missing pixel values for performing the respective interpolations, and wherein the interpolation estimations are weighted in combination at each level of approximation of missing pixel values for the frame being deinterlaced.

3. The method of claim 1, wherein the interlaced frame being deinterlaced comprises luminance values.

4. The method of claim 1, wherein the interlaced frame being deinterlaced comprises chrominance values.

5. The method of claim 1, wherein the at least one first interpolation comprises a vertical interpolation.

6. The method of claim 5, wherein the at least one first interpolation further comprises a linear temporal interpolation.

7. The method of claim 1, wherein the at least one second interpolation comprises an orientational interpolation.

8. The method of claim 1, wherein the at least one second interpolation comprises a bidirectional motion compensation interpolation.

9. A method for converting a sequence of interlaced video frames to a sequence of video frames formatted for progressive scanning, the method comprising the steps of:

performing a vertical interpolation for estimating missing pixel values in an interlaced frame being deinterlaced using known pixel values in the interlaced frame being deinterlaced;

performing a linear temporal interpolation for estimating missing pixel values in an interlaced frame being deinterlaced using known pixel values in the interlaced frames which, in time, immediately precede and follow the frame being deinterlaced;

computing a first level approximation of missing pixel values in the interlaced frame being deinterlaced from a weighted combination of the estimated missing pixel values obtained from the vertical and linear temporal approximations;

performing an orientational interpolation for estimating missing pixel values in the interlaced frame being deinterlaced using known pixel values in the interlaced frame being deinterlaced and missing pixel values computed for the first level approximation of the deinterlaced frame;

computing a second level approximation for missing pixel values in the interlaced frame being deinterlaced from a weighted combination of the estimated missing pixel values obtained from the vertical, linear temporal and orientational interpolations;

performing bidirectional motion compensation interpolations for estimating missing pixel values in the interlaced frame being deinterlaced using known and approximated missing pixel values in deinterlaced frames which, in time, immediately precede and follow the interlaced frame being deinterlaced, said preceding deinterlaced frame comprising approximated missing pixel values obtained from the performance of vertical, linear temporal, orientational and bidirectional motion compensation interpolations whose results are weighted in combination, said following deinterlaced frame comprising approximated missing pixel values obtained from the performance of vertical, linear temporal and orientational interpolations whose results are weighted in combination; and, computing a final approximation of missing pixel values for the interlaced frame being deinterlaced using the estimated missing pixel values obtained from a weighted combination of the estimations obtained from the vertical, linear temporal, orientational and bidirectional motion compensation interpolations which were previously performed with respect to the interlaced frame being deinterlaced.

10. An apparatus for converting a sequence of interlaced video frames to a sequence of video frames formatted for progressive scanning, the apparatus comprising:

a vertical interpolator for estimating missing pixel values in an interlaced frame being deinterlaced using known pixel values in the interlaced frame being deinterlaced;

a linear temporal interpolator for estimating missing pixel values in an interlaced frame being deinterlaced using known pixel values in the interlaced frames which, in time, immediately precede and follow the frame being deinterlaced;

a processor for computing a first level approximation of missing pixel values in the interlaced frame being deinterlaced from a weighted combination of the estimated missing pixel values obtained from the vertical and linear temporal approximations;

an orientational interpolator for estimating missing pixel values in the interlaced frame being deinterlaced using known pixel values in the interlaced frame being deinterlaced and missing pixel values computed for the first level approximation of the deinterlaced frame, said processor computing a second level approximation for missing pixel values in the interlaced frame being deinterlaced from a weighted combination of the estimated missing pixel values obtained from the vertical, linear temporal and orientational interpolations; and, a bidirectional motion compensation interpolator for estimating missing pixel values in the interlaced frame being deinterlaced using known and approximated missing pixel values in deinterlaced frames which, in time, immediately precede and follow the interlaced frame being deinterlaced, said preceding deinterlaced frame comprising approximated missing pixel values obtained from the performance of vertical, linear temporal, orientational and bidirectional motion compensation interpolations whose results are weighted in combination, said following deinterlaced frame comprising approximated missing pixel values obtained from the performance of vertical, linear temporal, and orientational interpolations whose results are weighted in combination, said processor computing a final approximation of missing pixel values for the interlaced frame being deinterlaced using the estimated missing pixel values obtained from a weighted combination of the estimations obtained from the vertical, linear temporal, orientational and bidirectional motion compensation interpolations which were previously performed with respect to the interlaced frame being deinterlaced.

11. The apparatus of claim 10, wherein the interlaced frame being deinterlaced comprises luminance values.

12. The apparatus of claim 10, wherein the interlaced frame being deinterlaced comprises chrominance values.

13. An apparatus for converting a sequence of interlaced video frames to a sequence of video frames formatted for progressive scanning comprising:

a first interpolator for performing at least one first interpolation using known pixel values in the interlaced sequence of frames for estimating missing pixel values in an interlaced frame being deinterlaced;

a processor for computing a first level approximation of missing pixel values in the interlaced frame being deinterlaced using the estimated missing pixel values obtained from the at least one first interpolations, wherein the processor weighs the at least one first interpolations in combination relative to the errors associated with each first interpolation in computing the first level deinterlaced frame; and, a second interpolator for performing at least one second interpolation for estimating missing pixel values in the interlaced frame being deinterlaced using known pixel values in the sequence of interlaced frames and approximated missing pixel values in the first level deinterlaced frame, wherein said processor computes a second level approximation of missing pixel values in the interlaced frame being deinterlaced using the estimated missing pixel values obtained from the at least one first and second interpolations, and wherein the processor weighs the at least one first and second interpolations in combination relative to the errors associated with each first and second interpolation which was performed.

14. The apparatus of claim 13, further comprising:

additional interpolators for estimating missing pixel values using previously approximated missing pixel values in deinterlaced frames, said additional interpolators performing estimation operations in sequence, wherein said sequence is comprised of interpolations which require a less accurate approximation of the missing pixel values for performing the respective interpolation estimation, said less accurate approximation interpolations being performed by the respective additional interpolators prior to the interpolations included in the sequence which require a more accurate approximation of the missing pixel values for performing the respective interpolations, and wherein the processor weighs the additional interpolation estimations in combination at each level of approximation of missing pixel values for the frame being deinterlaced.

15. The apparatus of claim 13, wherein the interlaced frame being deinterlaced comprises luminance values.

16. The apparatus of claim 13, wherein the interlaced frame being deinterlaced comprises chrominance values.

* * * * *